United States Patent [19]
Kraft et al.

[11] Patent Number: 5,259,643
[45] Date of Patent: Nov. 9, 1993

[54] GAS GENERATOR FOR AN AIR BAG

[75] Inventors: Josef Kraft, Berg; Gerrit Scheiderer; Hans Winkler, both of Furth, all of Fed. Rep. of Germany

[73] Assignee: Dynamit Nobel AG, Troisdorf, Fed. Rep. of Germany

[21] Appl. No.: 822,668

[22] Filed: Jan. 21, 1992

[30] Foreign Application Priority Data

Jan. 19, 1991 [DE] Fed. Rep. of Germany ....... 4101546

[51] Int. Cl.$^5$ ............................................. B60R 21/26
[52] U.S. Cl. .................... 280/740; 280/741; 102/531; 55/511
[58] Field of Search ............... 280/736, 740, 741, 742, 280/738; 422/164, 165, 166; 102/530, 531, 202.5, 470, 202.9; 55/485, 511

[56] References Cited

U.S. PATENT DOCUMENTS

| | | | |
|---|---|---|---|
| 2,220,127 | 11/1940 | Slayter | 55/485 |
| 3,266,228 | 8/1966 | Plizak et al. | 55/485 |
| 3,332,353 | 7/1967 | Burkardt et al. | 60/256 |
| 3,877,882 | 4/1975 | Lette et al. | 280/741 |
| 3,904,221 | 9/1975 | Shiki et al. | 280/741 |
| 3,958,949 | 5/1976 | Plantif et al. | 102/531 |
| 4,547,342 | 10/1985 | Adams et al. | 422/166 |
| 4,796,912 | 1/1989 | Lauritzen et al. | |
| 4,938,501 | 7/1990 | Wipasuramonton | |

FOREIGN PATENT DOCUMENTS

| | | | |
|---|---|---|---|
| 382552 | 8/1990 | European Pat. Off. | 280/736 |
| 2330194 | 12/1974 | Fed. Rep. of Germany | |
| 3914690 | 11/1989 | Fed. Rep. of Germany | |
| 4007551 | 9/1990 | Fed. Rep. of Germany | |
| 9013130 | 11/1990 | Fed. Rep. of Germany | |
| 64-41440 | 2/1989 | Japan | 280/736 |

Primary Examiner—Karin L. Tyson
Attorney, Agent, or Firm—Antonelli, Terry, Stout & Kraus

[57] ABSTRACT

A gas generator is provided with a housing which is open at two opposing end faces and a housing wall in which several gas orifices are arranged. The housing is formed as an extruded hollow profile of aluminum or an aluminum alloy. A combustion chamber is accommodated in the housing, in which combustion chamber gas-generating material which is ignitable by means of an ignition unit is accommodated. The combustion gases arising with the ignition of the gas-generating material are cleaned within the housing by filter elements and discharged by means of the gas orifices. The filter elements are supported by holding sections integral with the extruded hollow profile and are inserted by means of one of the open end faces of the extruded hollow profile. In the installed state the filter elements extend in a straight line between the holding sections associated therewith.

35 Claims, 3 Drawing Sheets

GAS GENERATOR FOR AN AIR BAG

BACKGROUND OF THE INVENTION

The invention relates to a gas generator and especially a gas generator for an air bag, the generator includes a housing, which is open at two opposing end faces and a wall of the housing has at least one gas orifice, two cover elements for closing the end faces of the housing, a combustion chamber, arranged in the housing and having at least one outlet orifice, for receiving and burning gas-developing material ignitable by means of an ignition unit and at least one filter element, arranged in the housing and having several wire mesh mats, for cleaning the combustion gases flowing therethrough.

Known gas generators are mostly round generators, whose housing is composed of several parts, which, to some extent, make necessary relatively costly connection techniques and processes for connecting the individual housing parts. The filter elements necessary with gas generators, with which filter elements the combustion-gas flow is cleaned, must be formed into costly shapes (tube form, bowl form, cap form) because of the geometric structure of the round generators. Advantages with regard to the assembly of the individual housing parts are offered by a tubular gas generator, as is known for example from DE 39 14 690 C2. The known tubular gas generator has a cylindrical outer tube, which represents the housing of the gas generator and whose open end faces are closed by cover elements. A cylindrical inner tube of smaller diameter is arranged coaxially in the outer tube; this inner tube defines the combustion chamber, in which there is accommodated a gas-generating material ignitable by means of an ignition unit, and whence is provided with several gas outlet orifices in the tube wall. A filter element is located in the annular chamber between the inner tube and the outer tube, the filter element generally consisting of a plurality of layers of wire netting, steel wool and/or fibreglass. The combustion gas issuing from the gas outlet orifices through the filter elements, which take up solid and liquid or condensed combustion products, and issues cleaned by means of the gas orifices in the outer tube. The wire mesh filter elements are relatively rigid and resistant to bending, for which reason they can only be shaped to correspond to the annular chamber with great effort. In a round gas generator the woven filter mats are brought or wound into welded round shapes. Due to the necessity of having to adapt the filter elements to the geometric reality of of the gas generator housing by means of deformation, the manufacture of the known gas generators is very cost-intensive. Specifically, tubular and round gas generators cannot be, or can scarcely be adapted to the spatial factors due to their geometric shape predetermined by the tubular housing. In this respect there are limits to the use of such gas generators for motor vehicle air bags.

SUMMARY OF THE INVENTION

The object of the invention is to create a gas generator as well as a housing for a gas generator, in which gas generator and in which housing, respectively, cut to size filter elements can be inserted, without having been previously deformed or processed in another way.

To achieve this object it is proposed with the invention that the housing is formed as an extruded hollow profile of aluminium or an aluminium alloy, manufactured in an extrusion process, and that the extruded hollow profile has integral holding sections, for a filter element opposing one another, between which holding sections, the filter element can be inserted by means of one of the open end faces of the extruded hollow profile, with the wire mesh mats extending in a straight line between the holding sections.

The housing of the gas generator, consisting of aluminium or an aluminium alloy, is manufactured in accordance with the invention by an extrusion process and is formed as an extruded hollow profile. The housing is therefore present as a made to measure product as it were; through variation of the length of the cut off hollow-profile pieces, gas generators can easily be manufactured with housings having different sizes or lengths. The holding sections for the filter element are integral with the extruded hollow profile, the holding sections being arranged opposite one another so that a filter element can be inserted between the holding sections by means of one of the open end faces of the extruded hollow profile. The filter element supported by the holding sections extends in a straight line; the wire mesh mats, with which the filter element is provided, must therefore not be shaped or processed in another way, so that they can be installed in the housing of the gas generator. Also there is no need for edging of the wire mesh mats, i.e. of the wire netting of the filter element, in particular the welding of the wire mesh mats to one another, the filter elements present as flat filter mesh mats therefore only need to be appropriately adjusted to the distance of the holding sections from one another and also to the length of the extruded hollow profile and can then be used directly. Since the holding sections for the filter elements are an integral component of the extruded hollow profile, they extend over the entire length of the profile, for which reason the filter element also extends over the entire length of the profile.

Advantageously, filter elements having calandered fine-steel filter mesh mats are used in the gas generator according to the invention.

The holding sections embrace the filter element laterally at its two opposing edges facing the housing wall, with the result that the filter element is secured against displacements in the direction of the combustion-gas flow and also in the opposite direction thereof. The holding sections are preferably U-shaped, with the two projecting limbs of the U-shape embracing the filter element at an edge.

Due to the manufacture of the housing by an extrusion process, the cross section of the housing, as far as its external dimensions and form are concerned, can be selected within wide limits. In particular, the extruded hollow profile of the housing can be manufactured to be round, with several corners or with a different external contour. The end faces of the extruded hollow profile are closed by covers adapted to the outer contour of the profile, with a flat seal preferably being arranged on the inner side of the covers for the gas-tight closing of the housing. The advantages of the gas generator or housing in accordance with the invention, in addition to a weight minimization, can be seen in particular in the simple and thus cost-favourable manufacture of the gas generator housing as an extruded hollow profile, the simple and thus cost-favourable formation of the wire-mesh mat filter elements and the simple installation of the filter element into the extruded hollow profile.

The combustion gases arising with the ignition and/or burning of the gas-developing material issue from the combustion chamber by means of the outlet orifice chamber thereof penetrate the filter element, arranged behind the outlet orifice when observed in the gas flow, and arrive, cleaned of solid and liquid (condensed) combustion products, by means of the gas orifice in the housing wall, into the area outside the gas generator, where they are used for filling and inflating an air bag in the case of an air bag of a vehicle. Of course, both the combustion chamber and the housing wall can be provided with several gas outlet or gas orifices. Likewise, several pairs of holding sections can be integral with the extruded hollow profile, in order to support several filter elements, with wire mesh mats of differing clear mesh width lying in series in the direction of flow.

Advantageously, the extruded hollow profile between the outlet orifice or openings of the combustion chamber and the gas orifice(s) in the housing wall has a discharge chamber, through which the combustion gases flow and in which holding sections are arranged for possibly several filter elements The discharge chamber allows the filter element(s) to be arranged in very different ways, allowing, in particular with the use of several filter elements, for them to be accommodated staggered or rotated relative to one another. Accordingly, the positioning of the pairs of holding sections for the filter elements is then to be selected. To deflect the combustion-gas flow within the discharge chamber the extruded profile of the housing has integrated intermediate walls projecting into the discharge chamber. Of course these intermediate walls do not partition the gas orifice of the housing wall completely from the outlet orifice in the combustion chamber. Rather, a discharge duct for the gas flow is created by means of the intermediate walls, the discharge duct extending over the entire length of the extruded hollow profile, possibly being wound repeatedly and connecting the outlet orifice of the combustion chamber with the gas orifice of the housing wall. Within this discharge duct several filter elements formed of wire mesh mats can be arranged, for which purpose appropriately positioned pairs of holding sections are required. However, the deflection of the combustion-gas flow additionally has a cleaning function as well, since particles originating during the combustion or condensed drops of liquid "move out of the gas flow", that is to say they are separated in the area of the deflection of the gas flow as a consequence of the centrifugal forces acting on them. Separator elements are therefore advantageously arranged in the area of the deflection of the combustion-gas flow, the separator elements normally likewise being wire mesh mats. This mesh should retain the separated drops of liquid and the solid particles, so that they can no longer be carried further by the gas flow. However, one can also conceive of collecting pockets, arranged in the area of the deflection on the inner surface of the housing wall, with openings directed inclined against the gas flow for collecting the particles and drops of liquid.

As already mentioned briefly heretofore, the holding sections for the filter element(s) are formed as U-shaped grooves, which embrace the filter elements on two sides. The holding sections are preferably formed as grooves integral with the outer wall of the housing. If intermediate walls are provided for deflecting the combustion-gas flow in the discharge chamber between the outlet orifice in the combustion chamber and the gas orifice in the housing wall, the holding sections for the filter element or elements are formed at the intermediate walls and on the inner surface of the outer wall of the housing, with the outer wall of the housing on the inner surface having a U-shaped first groove and the end of an intermediate wall facing this first groove having a second likewise U-shaped groove, which extends in parallel with the first groove; the filter element is arranged between the first and the second groove, which respectively embrace the filter element laterally.

It is also possible that the filter elements "clog" during the cleaning of the combustion-gas flow. If this takes place during the pressure build-up, the housing is in danger of bursting since the pressure cannot escape. In order to prevent the housing from bursting, in accordance with an advantageous embodiment of the invention it is provided that a holding section of a filter element have a predetermined breaking point for releasing the filter element from the holding section upon the exceeding of a certain combustion-gas pressure acting on the filter element. The filter element pulled from its holding section clears the path for the combustion-gas flow, which in this case is not cleaned, or, if several filter elements are present, is cleaned less well. However, allowance is made in favour of a housing which remains intact. The predetermined breaking point is preferably realized in that the U-shaped groove of the filter element concerned has a side-wall area of reduced wall thickness.

For the better filtering of the combustion-gas flow, several filter elements are advantageously provided, the wire mesh mats of which have different clear mesh widths. While the filter element which is first when observed in the direction of flow is relatively coarse, and holds back the large particles and also brings about a cooling of the combustion-gas flow as a secondary effect, the subsequent filter elements are increasingly finer in order to hold back smaller particles and condensed drops of liquid as well. It is advantageous if, in addition to the filter element or elements, a separator element is arranged, consisting of several wire mesh mats arranged on top of one another. The combustion gases do not flow or scarcely flow through a separator element of this kind; rather, the combustion-gas flow brushes against or over the separator element. The separator element is arranged in an area of the discharge chamber, in which the combustion-gas flow experiences a deflection. The centrifugal forces acting on the particles and the drops of liquid cause the particles and drops of liquid to be thrown out of the gas flow, where they are collected by the separator element. The separator element therefore behaves like a filter element, but its filtering is due to other physical relationships. Since the gas flow does not penetrate the separator element or does so only in the surface region, the separator element presents a smaller resistance to the gas flow than a filter element.

The separator element is arranged on the inner surface of the outer wall of the housing, being supported by the latter. During the filtering process the separator element gradually clogs with particles and drops of liquid. The thickness of the separator element, i.e. the number of wire mesh mats, must therefore be appropriately selected In order to increase the receptivity of the separator element, the inner surface of the outer wall of the housing is provided with recesses in the area adjoining the separator element, and which receive the particles and/or drops of liquid penetrating the separator element. In this development of the invention it is possible to construct the separator element so that it is less strong, since a dumping action is attained by means of the recesses in the outer wall of the housing which unloads the separator element.

However, in place of a separator element in the form of wire mesh mats, a material could also be provided which catalytically makes harmful combustion products harmless.

In order to unload all the filter elements and potential separator elements, in accordance with a further advantageous embodiment of the invention it is provided that the inner surface of the outer wall of the housing has several receiving pockets in that area of the discharge chamber which is attached to the outlet orifice of the combustion chamber, the receiving pockets being open towards the outlet orifice. These receiving pockets, which are arranged in herring bone fashion and whose opening planes extend at an acute angle to the direction of flow, collect the particles and/or condensed drops of liquid transported by the combustion-gas flow as well. The receiving pockets can be integral with the extruded hollow profile just like the recesses associated with a separator element. Moreover, the receiving pockets are formed by flanges which project inwardly, are directed inclined to the outlet orifice at least in the end region and are integral with the housing wall.

The cover elements are secured advantageously with screws, which are formed in receiving boreholes in the front ends of the extruded hollow profile. Advantageously, the extruded profile of the housing has several through passages also produced during the manufacture of the profile, the ends of the passage boreholes on both sides receiving the fastening screws by means of threads. The diameter of the through passages is preferably the same as the core-hole borehole diameter of the thread to be worked in. The core-hole boreholes therefore do not need to be introduced subsequently; rather they are obtained automatically with the manufacturing of the profile.

Advantageously, the combustion chamber can be a separate tubular element, whose end faces are open and which can be inserted by means of one of the open ends of the housing into a receiving passage opening formed in the extruded hollow profile and which can be closed by the cover elements at its open ends like the open end faces of the extruded hollow profile. It is advantageous if the combustion chamber with end faces already closed is inserted into the extruded hollow profile. On the assembly of the gas generator, there can here be employed a combustion chamber which is already filled with gas-developing material. In this way the setting up of the gas generator is simplified.

The cross section of the combustion chamber is fundamentally arbitrary. In all cases extruded hollow profile and combustion chamber are coordinated with one another in such a way that both are connected to one another in form-locking manner and with closed extruded hollow profile in force-locking manner. To optimize the strength of the combustion chamber the latter advantageously has a circular cross section.

The combustion chamber is preferably an integral component of the extruded hollow profile of the housing, with the outlet orifice of the combustion chamber being formed as a slot extending over the entire length of the extruded profile. In this embodiment of the invention the extruded hollow profile is formed in such a way that it has a (combustion) cavity, which represents the combustion chamber and is filled with the gas-generating charge. The connection of the combustion cavity to the discharge chamber leading to the gas orifice takes place by means of the outlet orifice introduced into the extruded hollow profile, the outlet orifice being a slot because of the manufacture of the gas generator housing in the extrusion process.

If the ignition unit is arranged in the middle of the combustion chamber, therefore penetrating the outer wall of the housing and being fastened thereto, it is advantageous if at an external surface of the outer wall of the housing in the region of the combustion chamber there are provided two projecting holding projections, which are integral with the extruded profile and have symmetrical recesses lying within and facing one another, between which a support element for the ignition unit can be inserted by means of one of the end faces of the extruded profile, the support element extending between the recesses and being supported by them. The ignition unit is screwed to the support element, the ignition unit extending in the installed state through two openings, in alignment with one another, in the outer wall of the housing and in the combustion chamber or—with integral construction of housing and combustion chamber—through an opening in the outer wall of the housing into the combustion chamber. On installing the ignition unit during the setting up of the gas generator, first of all the support element is pushed between the recesses up to the position of the opening of the outer wall of the housing arranged between the holding projections, whereupon the ignition unit is inserted into the support element, to project into the combustion chamber. Threaded holes or other manipulations or arrangements of the gas generator housing for securing the ignition unit are therefore not necessary in this embodiment of the invention which has, an advantageous effect on the manufacture of the gas generator.

With regard to the manufacture it is advantageous if the ignition unit is arranged at one of the end faces of the combustion chamber. In this case it is supported by the accompanying cover of the housing. If the combustion chamber is closed at its end faces by separate cover elements, the ignition unit extends through these cover elements into the inside of the combustion chamber. With single-side fitting of the ignition unit it is advantageous if the ignition unit has a flame-guiding tube with openings in the tube wall, the tube projecting into the gas-generating material and distributing the ignition flames generated by the ignition unit evenly on to the gas-generating material by means of the openings.

The gas generator for an air bag is normally designed in such a way that the pressure gas generated with the ignition of the gas-generating material is sufficient in order to fill the air bag taut. In addition, however, systems have also been developed in which the filling of the air bag is supported b ambient air carried along by the issuing combustion-gas flow. In these systems the pressure gas alone would not fill the air bag taut. If the gas flow can issue unhindered from the orifices, i.e. if the air bag can expand unhindered, the gas flow carries ambient air along. This ambient air is drawn by means of air inlet openings provided with one-way valves in a rigid housing part of the air bag incorporating the gas generator or through air supply lines penetrating this housing part. If the air bag meets an obstacle during its expansion, the conditions necessary for carrying along ambient air do not develop within the air bag. The higher internal pressure of the bag arising through the prevention of the unfolding of the air bag ensures that the one-way valves, which are normally formed as resetting flap valves, close the air inlet openings earlier than is necessary for the complete taut filling of the air bag. The consequence of this is that the air bag does not fill taut with the mixture of gas and air. These systems have been developed particularly with regard to safety aspects; specifically, if when there is inadvertent release of an air bag there is a person in the area directly in front of it, for example a child standing in the foot well or on the front seats of the motor vehicle, the child can no longer be thrown from or against the backrest or the front seat by the air bag expanding to a dangerous extent.

Gas generators for the air-bag safety systems previously described therefore require a nozzle, connected after the gas orifice or openings, "to concentrate" the combustion-gas flow. A nozzle of this kind can easily be incorporated in the form of a socalled flat nozzle into the extruded hollow profile of the housing. Moreover, in accordance with an advantageous embodiment of the invention it is provided that several gas orifices are arranged in the longitudinal direction of the extruded hollow profile of the housing and that curved edge sections projecting outwardly are arranged on the housing at both longitudinal sides of the row of gas orifices. The curvature is thereby chosen in such a way that the clearance width between the edge sections, seen first of all in the direction of the gas flow, decreases behind the gas orifices, in order to increase after a certain point. The edge sections, which in this connection are preferably curved in an arched manner, form a flat nozzle which operates after the gas orifices.

Advantageously, the edge sections of the outer wall of the housing, forming the flat nozzle, define a slot in the outer wall of the housing. Moreover, the curved edge sections project slightly into the inside of the housing. These projecting regions of the edge sections are advantageously embraced by the turned-up longitudinal edges of a perforated strip provided with several holes, the longitudinal edges being provided with hook-shaped ends. The perforated strip can be slipped on by means of one of the end faces of the extruded hollow profile. The type of construction, described here, of the row of gas orifices in the perforated strip as well as the flat nozzle has advantages particularly in terms of manufacturing technology; the gas orifices namely no longer need to be introduced—between the curved edge sections—into the housing wall; rather, only the prefabricated perforated strip is inserted. The holes can be manufactured in the perforated strip substantially easier than in the extruded hollow profile, which can have an outer contour corresponding to the respective spacial conditions and therefore cannot be handled as easily as a material strip, into which holes must be introduced. Moreover, the holes in the perforated strip can be formed to be larger than the clearance width of the curved edge sections, which determines the maximum diameter of the gas orifices when these are introduced directly into the outer wall of the housing.

A further advantageous embodiment of the invention is characterized in that to improve the entraining of ambient air as a consequence of the combustion gas issuing from the flat nozzle in the area of the flat nozzle, air-guiding plates are provided, which are connected each as one piece to the housing and are arranged at a distance to each other, the air-guiding plates extending over the entire length of the extruded hollow profile of the housing, with through openings being formed in the connection area between housing and air-guiding plates for drawing in the ambient air. The air-guiding plates are at an angle to one another, with their clearance diminishing with increasing distance from the gas orifices. The air-guiding plates extend to both ends of the through openings and extend to the rigid housing part of the air-bag system incorporating the gas generator. The region of the housing part between the air-guiding plates, the outer wall of the housing of the gas generator and the air-guiding plates together define an intake chamber, which is connected to the exterior by means of the air inlet opening with one-way valves open. The combustion-gas flow issuing by means of the flat nozzle generates a vacuum in the area around the flat nozzle, the vacuum also predominating in the intake chambers at both sides of the housing of the extruded profile as a result of the through openings. Due to the vacuum, the one-way valves formed as flap valves open, with the result that air is drawn from outside the rigid housing region of the flexible air bag system into the air bag. If the flexible air bag does not expand further due to an obstacle, the internal pressure in the air bag increases with further issuing combustion gases, for which reason the one-way valves opening after a certain vacuum close the air inlet opening. The improvement in the entrainment of ambient air realized by the air-guiding plates contributes to a faster filling of the air bag.

In addition to the gas generator described above, the invention also relates to a housing for a gas generator of this type, in particular a housing for an air-bag gas generator, having a housing body which is open at two opposing ends. The housing in accordance with the invention is characterized in that the housing body is formed as an extruded hollow profile of aluminium or an aluminium alloy manufactured on the extrusion process and in that the extruded hollow profile has integrated holding sections for at least one filter element and opposing one another.

Housing bodies of most varied forms can be manufactured by the extrusion process. In particular, housing bodies can be manufactured whose outer form can take into account the given space conditions and whose inner construction, in particular as far as the formation of the combustion chamber and the discharge chamber is concerned, can be freely selected within wide limits. The features of advantageous housing formations in accordance with the invention have already been described in detail above in connection with the description of the gas generator.

BRIEF DESCRIPTION OF THE DRAWINGS

In the following description, exemplifying embodiments of the invention are explained in more detail with reference to the accompanying drawings wherein.

DETAILED DESCRIPTION OF THE INVENTION

Figure 1:
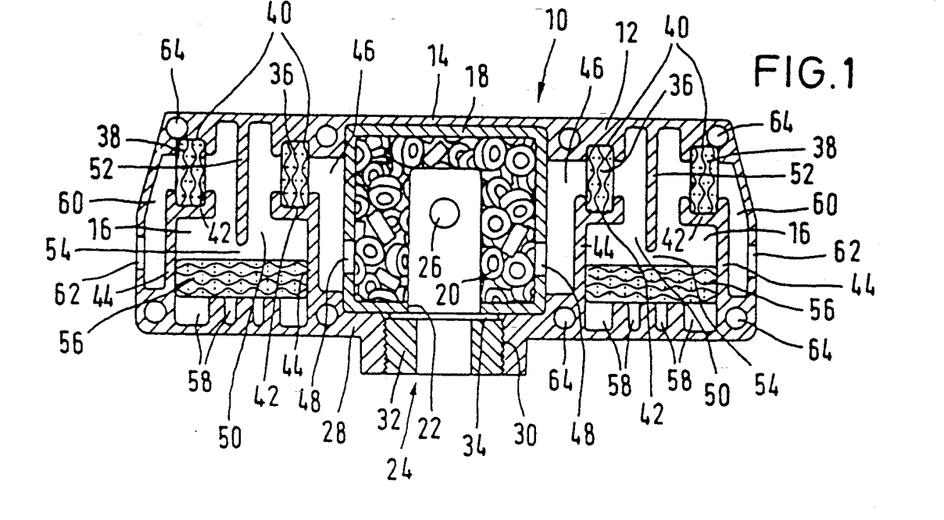
FIG. 1 is a cross sectional view through a gas generator in accordance with a first embodiment.

In FIG. 1 the housing 10 of a pipe or tubular gas generator is shown in cross section in accordance with a first exemplifying embodiment of the invention. The housing 10 is an extruded hollow profile or element 12 of aluminium or an aluminum alloy. The cavity in the extruded profile 12 can be subdivided into three regions: a central region 14 as well as two lateral passage cavities 16 positioned on both sides of the central region 14. Open end faces of the extruded hollow profile 12 or of the housing 10 are closed by cover elements which are not shown in FIG. 1. A high-pressure combustion chamber 18, e.g., of stainless steel is arranged in the central cavity region 14, with gas-generating material 20 being located in the form of pellets in the combustion chamber 18. The combustion chamber 18 has in cross section the form of a square tube with rounded edges; the square tube is inserted in form-locking manner into the central cavity region 14 of the extruded hollow profile 12. The central cavity region 14 is therefore adapted to the outer contours of the combustion chamber 18. The rectangular tube cross section of the high-pressure combustion chamber allows a good utilization of the space present in the extruded hollow profile 12 so that a relatively large amount of gas-developing material can be accommodated in the housing 10 in spite of the very small external dimensions of the housing.

The combustion chamber 18, like the extruded hollow profile 12, is closed by cover elements at its end faces this not being shown in FIG. 1. The combustion chamber 18 has an opening 22, through which an ignition unit 24 extends for the ignition of the gas-developing material 20. The ignition unit 24 is provided with openings 26 in the region projecting into the combustion chamber 18, by means of which openings the ignition vapours (including ignition flames) issue when the ignition unit is ignited and ignite the gas-developing material 20. In the region of the opening 22 of the combustion chamber 18, there is formed a coaxial receiving through opening 30 in alignment with the opening 22 in the housing wall 28 of the extruded hollow profile 12, the opening 30 being formed with an internal thread into which a holding ring 32 with external thread is screwed. At its lower end the ignition unit 24 has an annular flange 34, which on the outside abuts the combustion chamber 18 in the area of the edge of the opening 22 and with holding ring 32 screwed in, is pressed against the combustion chamber 18. The ignition unit 24 is ignited electrically.

Two filter elements 36,38 are respectively arranged in the lateral passage cavities 16 of the housing 10, the filter elements being arranged in series and the combustion-gas flow passing through the filter elements. The filter elements 36,38 consist of a suitable combination of calandered wire mesh layers of fine steel and filter layers lying between them, for which reason these elements are relatively rigid and resistant to bending. The filter elements have a cross section which is rectangular when observed in the direction of flow, and extend over the entire length of the extruded hollow profile 12. The filter elements 36,38 are supported at two opposing edges by holding sections incorporated within the extruded hollow profile 12. The holding sections are grooves 40 which are U-shaped in cross section and which are formed on the inside of the housing wall 28. Two such grooves 40 are provided per filter element. While one of these grooves 40 is incorporated directly in the housing wall, the other groove 42 is formed in the ends of intermediate walls 44 facing the grooves 40, which project into the passage cavities 16. The ends of these intermediate walls 44 facing the grooves 40 are formed in a forkshaped manner and embrace the filter elements 36,38 on the side directed away from the grooves 40 of the housing wall 28. The grooves 40,42 extend parallel to one another and lie opposite one another, so that the filter elements 36,38 can be inserted into the extruded hollow profile 12 without having been previously deformed, enclosed or welded to the edge.

The intermediate walls 44 with the filter elements 36,38 subdivide each discharge chamber 16 into three parts or chambers. The first chamber 46 is bounded by the wall of the combustion chamber which bounds the discharge chamber 16, the filter element 36 as well as the intermediate wall 44 supporting the element. Several outlet orifices 48 are arranged in the combustion chamber 18, by means of which outlet orifices the combustion gases flow into the first chamber 46. The outlet orifices 48 are staggered relative to the filter element 36 so that the gas flow in the chamber 46 experiences a deflection before it flows through the filter element 36. The chamber 46 can also be termed an expansion chamber.

A second chamber 50 is formed between the two filter elements 36,38 and the intermediate walls 44. A further intermediate wall 52 projects into this second chamber 50 and is spaced from the lower portion of housing wall 28; the intermediate wall extends between the two filter elements 36,38, and prevents a direct flowing of the combustion gases from the first filter element to the second element. Due to the disposition of the intermediate wall 52 the combustion-gas flow in the second chamber is deflected. The intermediate wall 52 does not cross the entire chamber 50; rather, between the free end of the intermediate wall 52 and the housing wall 28 an opening 54 forms, which is staggered relative to the filter elements 36,38. The combustion-gas flow entering the second part chamber 50 by means of the filter element 36 is therefore deflected by 180° around the end of the intermediate wall 52, in order to flow between the intermediate wall 44 supporting the filter element 38 and the intermediate wall 52 to the filter element 38. A separator element 56 is arranged in the area of the through opening 54, the separator element consisting of a suitable combination of calendered wire mesh layers. The separator element 56 does not extend over the entire space between the end of wall 52 and the wall 8, which forms opening 54; the gas flow deflected around the intermediate wall 52 in the first instance therefore passes across the surface of the separator element 56. The separator element 56 arranged in the deflection area takes up particles and condensed drops of liquid which have not been collected by the filter element 36. The filter element 36 in the first instance has a cooling function and should reduce the temperature of the combustion gases Due to the centrifugal forces acting on the particles and drops of liquid during the deflection around the end of the intermediate wall 52, these are "thrown" into the separator element 56, where the particles settle. The separator element 56 extends between the two intermediate walls 44 supporting the filter elements 36,38, abutting them with two of its opposing side edges and being held in a pinched manner. In the area in which the separator element 56 abuts the housing wall 28, the wall is provided with recesses 58 in the form of grooves, in which accumulate the particles (slag) or condensed drops of liquid arising during the combustion and which penetrate the separator element 56. The recesses 58 therefore enlarge the reception capacity of the separator element 56, by relieving the element.

After the flow of combustion gases has passed through the filter element 38, it arrives in the third chamber 60 which is bounded by the housing wall 28, the filter element 38 and the intermediate wall 44 carrying the element 38. In the region of the section of 35 the housing wall 28 bounding the third chamber 60, gas orifices 62 are formed in the housing wall, by means of which openings the combustion gases flow out of the housing 10. The combustion gases flowing out, which are sufficiently freed of particles and drops of liquid by means of the two filter elements 36,38 as well as the separator element 56, arrive, if the gas generator is a part of an air-bag system, in the air bag, which they fill taut.

The extruded hollow profile 12, has through passages 64 for fastening the covers to the end faces thereof, which passages extend over the entire length of the extruded hollow profile and are produced together with the profile. The through passages 64 are provided at their ends with internal threads for receiving fastening screws, by means of which the covers are screwed to the extruded hollow profile 12.

Figure 2:
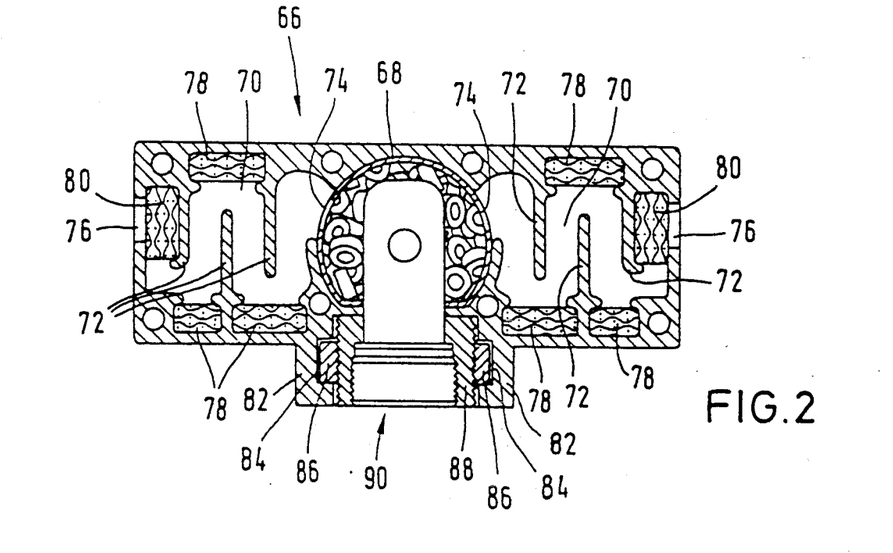
FIG. 2 is a cross sectional view through a gas generator in accordance with a second embodiment.

A second embodiment of a gas generator housing 66 is shown in FIG. 2. Like the housing shown in FIG. 1, the housing 66 is also formed as an extruded hollow profile or element of aluminium, manufactured in an extrusion process. To optimize the strength of the combustion chamber 68, it has a circular tubular cross section. Three intermediate walls 72 project into the passage cavities 70 at both sides of the combustion chamber 68, the intermediate walls being arranged in such a way that a meander-shaped discharge duct forms between the outlet orifices 74 of the combustion chamber 68 and the gas orifices 76 of the housing 66. In the regions in which the combustion-gas flow is deflected in each case by 180°, separator elements 78 are arranged in the housing wall, being located in niches incorporated in the housing wall. The openings of the niches towards the discharge duct are tapered, so that the separator elements 78 in the niches are secured against being pulled out. The gas orifices 76 are covered by a filter element 80. It is also to be mentioned that in the region of the combustion chamber 68 the housing wall has two outwardly projecting holding projections or ribs 82, which are arranged at a distance to one another and on the inner sides which face one another are provided with U-shaped recesses 84. A support ring 86 is inserted into these recesses 84 with two opposing flattened side edges. The support ring 86 has an internal thread into which a substantially cylindrical holding body 88 with external thread is screwed. Due to the flattened side edges, the support ring 86 is prevented from being rotated while the ignition unit 90 is screwed in. The ignition unit 90 is fastened to the holding body 88 in a manner which is not described in more detail here, the ignition unit extending in the installed state through openings in alignment with one another in the housing and the combustion chamber into the latter.

Figure 3:
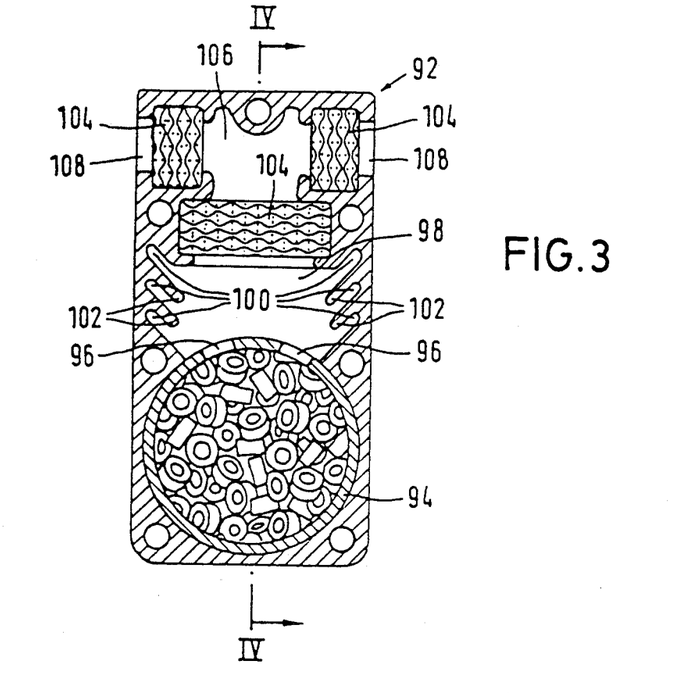
FIG. 3 is a cross sectional view through a gas generator in accordance with a third embodiment.
Figure 4:
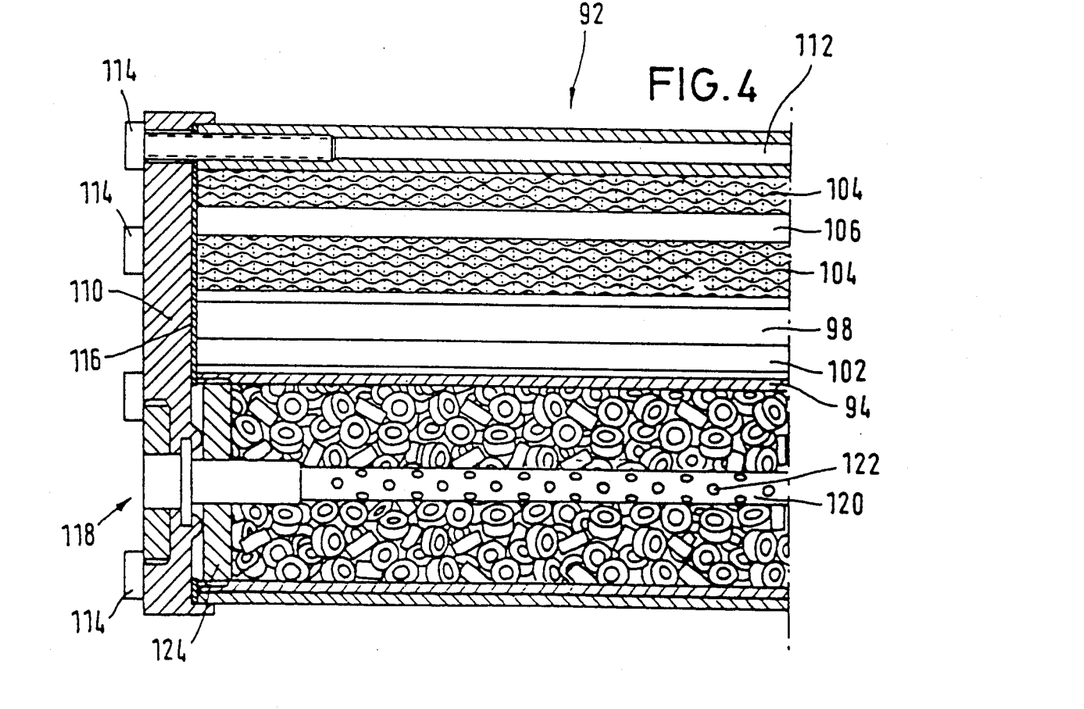
FIG. 4 is a view taken along line IV—IV of FIG. 3, i.e. a longitudinal section, partially, through the gas generator shown in cross section in FIG. 3.

The housing 92 of a gas generator in accordance with a third embodiment is shown in cross-sectional and longitudinal-sectional views in FIGS. 3 and 4, respectively. A difference of this housing 92 with regard to those shown in FIGS. 1 and 2 consists in that the combustion chamber 94 is arranged in an edge region of the extruded hollow profile of the housing 92, the construction of the housing 92 therefore being asymmetrical. The combustion chamber 94 has two rows of adjacent outlet orifices 96, by means of which the combustion gases from the ignited gas-generating material reach the adjoining discharge chamber 98. Several receiving pockets 100 are formed in the region of the discharge chamber 98 on the inside of the housing wall. The receiving pockets 100 are formed by flanges 102 which are arranged at a distance to one another and are directed inclined to the outlet 35 orifices 96 of the combustion chamber 94. The receiving pockets 100 have the object of collecting slag and other particles as well as drops of liquid which have been transported along by the flow of combustion gases, in order thereby to relieve the subsequently connected filter elements 104. As in the embodiments in accordance with FIGS. 1 and 2, the filter elements 104 of the gas generator housing shown in FIGS. 3 and 4 are also a suitable combination of wire mesh layers and filter layers. After the penetration of the first filter element 104 the combustion gases arrive in a cavity 106 which the gases leave after the penetration of the two additional filter elements 104 which are arranged rotated by 90° with regard to the first filter element 104 and directly in front of gas orifices 108.

As can be recognized with reference to FIG. 4, the covers 110 on the end faces of the extruded hollow profile of the housing 92 are screwed thereto. For this purpose, the extruded hollow profile has several through passages 112, whose ends are provided with an internal thread for receiving the fastening screws 114. The covers 110 are provided on their insides with flat seals 116 for the gas-tight closing of the end faces of the housing 92. As can be recognized also in FIG. 4, the ignition unit 118 is not fastened in the housing wall, but rather to one of the covers 110. The ignition unit 118, which is only shown schematically in FIG. 4, has a flame-guiding tube 120 with several openings 122, which penetrates far into the gas-developing material of the combustion chamber 94 and by means of which the ignition vapours are guided in an evenly distributed manner to the gas-developing material. In the embodiment of the gas generator housing 92 shown in FIGS. 3 and 4, the combustion chamber 94 is 35 closed by means of separate covers 124 at its end faces. On the outside the covers 110 for the gas generator housing 92 respectively abut the separate covers 124, the covers 110 preventing a "blasting off" of the covers 124 of the combustion chamber 94 with the ignition of the gas-generating material. The ignition unit 118 is fastened to or supported on the covers 110 of the gas generator housing 92 by suitable means which are not described here in more detail.

Figures 5, 7:
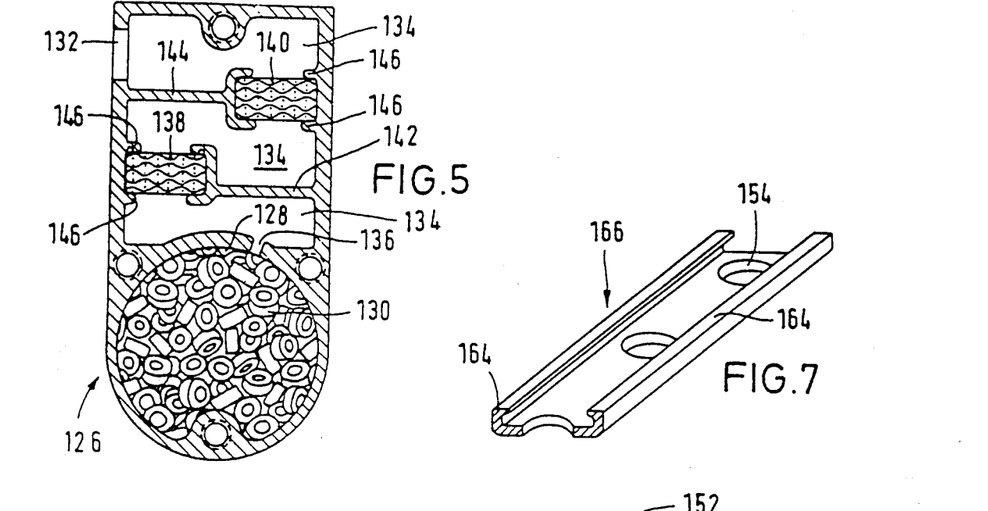
FIG. 5 is a cross sectional view through a gas generator in accordance with a fourth embodiment.
FIG. 7 is a cross-sectional view through a perforated strip of the gas generator according to FIG. 6, the perforated strip being shown in perspective.

The housing 126 of a gas generator in accordance with a further embodiment is shown in FIG. 5. The special feature of the housing 126 consists in that the combustion chamber 128 is an integral component of the extruded hollow profile. The gas-generating material 13 is therefore poured directly into the cavity of the extruded profile of the housing 126, the cavity forming the combustion chamber 128. The outlet orifice, by means of which the combustion gases arrive from the combustion chamber 128 into the discharge chamber 134 leading to the gas orifices 132 of the housing 126, is formed as a slot 136 extending over the length of the extruded hollow profile.

In the discharge chamber 134 there are located two filter elements 138,140 operating one after the other, which are staggered relative to one another and are supported by holding sections, formed as U-shaped grooves, between the housing wall and intermediate walls 142,144 projecting into the discharge chamber 134. The intermediate walls 142,144 supporting the filter elements 138,140 are formed in a fork-shaped manner and embrace the filter elements 138,140 laterally. U-shaped grooves on the housing wall are formed by ribs 146 arranged at a distance to one another. A predetermined prescored breaking point 181 is formed in the fork-shaped end of the intermediate wall 142 supporting the first filter element 138 when observed in the direction of flow, the predetermined breaking point allowing a release of the filter element 138 upon the exceeding of a certain combustion-gas pressure. The preset breaking point at the holding sections for the first filter element 138 is created by the rib 146 which abuts the side of the filter element 138 directed away from the combustion chamber 128 and having a reduced thickness in the transition area to the housing wall. However, it is likewise also possible, as shown in FIG. 5, that a section of the fork-shaped end of the intermediate wall 142 which abuts the side of the filter element 138 directed away from the combustion chamber 128 has a reduced wall thickness. If the filter element 138 has clogged, with the result that the pressure of the combustion gases issuing from the outlet slot 136 rises, upon the exceeding of a certain force acting on the filter element 138 its holder breaks, before the housing 126 bursts open. The installation of predetermined breaking points at the holding sections of possibly all the filter elements is therefore to be recommended with regard to safety aspects.

Figure 6:
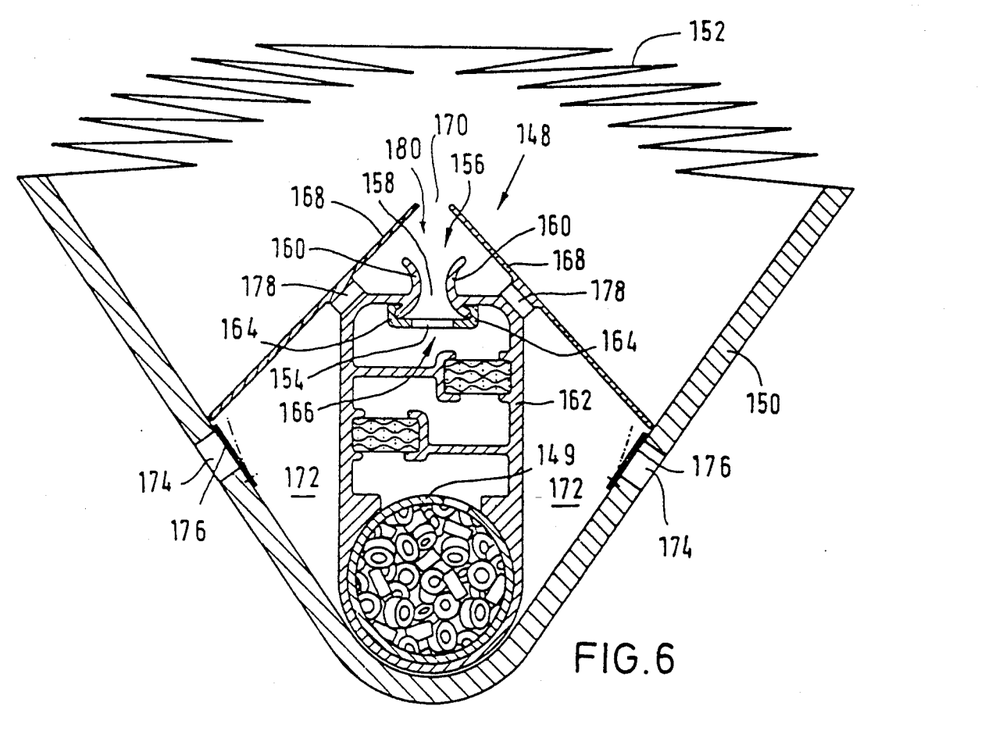
FIG. 6 is a cross sectional view through an embodiment of a gas generator with flat nozzle and air-guiding plates connected after the gas orifices.

The housing 148 of a gas generator in accordance with the last embodiment of the invention is shown in FIGS. 6 and 7. The rigid housing part 150 of an air-bag system, the housing part incorporating the gas generator, is also shown with indicated folded air bag 152 in FIG. 6. The construction of the gas generator housing 148 corresponds with the gas generator housing 126 shown in FIG. 5 as far as the arrangement of the intermediate walls, filter elements and combustion chamber is concerned. The combustion chamber 149 of the housing 148, however, is formed as a separate part with circular cross section. Differing from the embodiment according to FIG. 5, a flat nozzle 156 is provided with the housing 148 after the gas orifices 154. The flat nozzle 156 is essentially a widened slot 158 formed in the extruded hollow profile of the housing 148. The slot 158 is formed at its longitudinal sides by curved edge sections 160 which are moulded in one piece to the housing wall 162. The curved edge sections 160 project outwardly and inwardly over the housing wall 162. The arrangement of the edge sections 160 and their curvature is chosen in such a way that the clearance width of the edge sections 160 proceeding from the slot 158 of the housing wall 162 first of all diminishes with increasing distance from the housing wall 162, in order to enlarge subsequently. The turned-up curved edge sections 160 which extend over the entire length of the extruded hollow profile form the flat nozzle 156 together with the slot 158.

The areas of the edge sections 160 projecting into the inside of the housing are embraced by the turned-up longitudinal edges 164, formed in a hook-shaped manner, of a perforated strip 166, shown also in FIG. 7, the gas orifices 154 being formed in the perforated strip. The perforated strip 166 is connected in a form-locking manner to the inwardly projecting ends of the edge sections 160 and holds the housing wall 162 together in the area of the slot 158. The advantage of the use of a separate perforated strip 166 consists, in particular, in that the diameter of the gas orifices 154 incorporated therein can be made to be larger than the smallest distance of the bowed edge sections 160 from one another.

Two air-guiding plates 168 are connected, each in one piece to the housing wall 162, the air-guiding plates 168 being arranged at both longitudinal sides of the flat nozzle 156 in the region thereof. The two air-guiding plates 168 extend at an acute angle to one another, with their upper ends which face one another being located over the flat nozzle 156 and being arranged at a distance to one another, the edges of the upper ends therefore defining a gap 170 in alignment with the flat nozzle 156. The transverse extension of the air-guiding plates 168 in the direction perpendicular to the longitudinal extension of the extruded profile is measured in such a way that the air-guiding plates 168 with their lower ends opposing the upper ends reach as far as the rigid housing part 150 and abut there. The rigid housing part 150, the air-guiding plates 168 and the outer wall of the housing 162 form air-intake chambers 172 at both longitudinal sides of the gas generator housing 148. Ventilation openings 174 leading into the air-intake chambers 172 are formed in the rigid housing part 150, the ventilation openings being covered by flanges 176 fastened on one side on the inner side of the rigid housing part 150, the flanges consisting of a springlike material. The flanges 176 provide one-way flap valves for the automatic opening of the ventilation openings 174 with a vacuum in the air-intake chambers 172 and for the closing of these ventilation openings 174 with a pressure increase by means of the vacuum necessary for the opening. Air-intake openings 178 are arranged in the very large connection regions between the airguiding plates 168 and the housing wall 162, by means of which openings the combustion-gas flow issuing from the flat nozzle 156 draws air into the chamber 180 between the air-guiding plates 168 around the flat nozzle 156.

In the air-bag system represented in FIG. 6 the air drawn in is urgently required for the filling of the air bag 152. It is therefore necessary that the issuing combustion-gas flow entrains as much air as possible so that a large quantity of air is drawn in from outside. The subsequent connection of the flat nozzle 156 'concentrates' the combustion-gas flow so that a concentrated gas flow arises. In the chambers 180 and 172 connected to one another by means of the air-intake openings 178 this gas flow ensures a vacuum which opens the ventilation openings 174 so that ambient air is drawn in from the outside. If the air bag 152 cannot unfold as planned with combustion gases still flowing out, the pressure in the chambers 180 and 172 increases so that the ventilation openings 174 close. A taut filling of the air bag 152 is now no longer possible. Both the flat nozzle and the air-guiding plates can easily be produced in the extrusion process as integral components of the housing 148.

It will be appreciated that the filter elements comprise wire mesh mats or layers made of preferably stainless steel; whereas the filter layers are made up of fine wire mesh or wool made preferably of stainless steel. The material of the wire must have sufficient stiffness and heat resistance and preferably should also exhibit good heat conductivity to achieve the desired cooling effect of the hot gases of he burning gas-generating material 20. For such reasons, the wire is preferably made of metal, especially stainless steel. It is also possible to use fiber glass for the wire mesh provided that the wire is sufficiently thick to have the required thickness.

What is claimed is:

1. A gas generator, in particular a generator for an air bag of a vehicle comprising:
    a housing which is open at two opposing end faces and which has an outer wall with at least one gas orifice for discharging of cleaned combustion gases;
    two cover elements for closing the end faces of the housing;
    a combustion chamber for receiving and burning gas-generating material ignitable by means of an ignition unit located therein, said chamber being arranged in the housing and having at least one outlet orifice in a wall of the chamber for discharging of combustion gases; and
    at least one filter element arranged in the housing, each filter element having several wire mesh mats for cleaning the combustion gases flowing therethrough, characterized in that
    the housing is formed as a longitudinally extruded hollow profile of aluminium or an aluminium alloy manufactured in an extrusion process, the extruded hollow profile has integral intermediate walls for deflecting the combustion-gas flow, said intermediate walls projecting into a discharge chamber between the outlet orifice of the combustion chamber and the gas orifice of the housing, and the extruded hollow profile as integral holding sections for each filter element opposing one another and extending a length of the housing, between which holding sections a filter element can be inserted by means of one of the open end faces of the extruded hollow profile, with the wire mesh mats extending the length of the housing in a straight line between the holding sections.

2. A gas generator according to claim 1, characterized in that a discharge chamber is formed between the outlet orifice of the combustion chamber and the gas orifice for the combustion-gas flow, the holding sections being arranged in the discharge chamber.

3. A gas generator according to claim 1 or claim 2, characterized in that holding sections for several filter elements are provided, with clear mesh widths of the wire mesh mats of the several filter elements being different.

4. A gas generator according to claim 3, characterized in that the filter elements are arranged so that the filter elements are staggered and/or rotated relative to one another.

5. A gas generator according to claim 1, characterized in that a separator element is arranged in the region of a deflection of the combustion-gas flow, the separator element consisting of several wire mesh mats arranged on top of one another and acting to collect particles and/or condensed drops of liquid transported along by the combustion-gas flow.

6. A gas generator according to claim 5, characterized in that the separator element is arranged so that it abuts an inner surface of the outer wall of the housing and is supported by the inner surface.

7. A gas generator according to claim 6, characterized in that the inner surface of the outer wall of the housing in the area butting the separator element is provided with recesses for receiving particles and/or condensed drops of liquid penetrating the separator element.

8. A gas generator according to claim 1, characterized in that the extruded profile of the housing has several through passages, also produced during the manufacture of the extruded profile, for receiving fastening screws for fastening the cover elements to the end faces of the extruded profile.

9. A gas generator according to claim 1, characterized in that the combustion chamber is a separate tubular element, having open ends, said tubular element being inserted by means of one of the open ends of the housing into a receiving through passage formed in the extruded profile, and closable by the cover elements or by separate covers at its ends like the open end faces of the housing.

10. A gas generator according to claim 1, characterized in that the ignition unit is arranged at one of the end faces of the combustion chamber and is supported by an accompanying cover element of the housing.

11. A gas generator according to claim 10, characterized in that the ignition unit comprises a flame-guiding tube having openings in a tube wall, said tube being plunged into the gas-generating material.

12. A gas generator, in particular a generator for an air bag of a vehicle comprising:
    a housing which is open at two opposing end faces and which has an outer wall with at least one gas orifice for discharging of cleaned combustion gases;
    two cover elements for closing the end faces of the housing;
    a combustion chamber for receiving and burning gas-generating material ignitable by means of an ignition unit located therein, said chamber being arranged in the housing and having at least one outlet orifice in a wall of the chamber for discharging of combustion gases; and
    at least one filter element arranged in the housing, each filter element having several wire mesh mats for cleaning the combustion gases flowing therethrough,
    characterized in that
    the housing is formed as an extruded hollow profile of aluminium or an aluminium alloy manufactured in an extrusion process and
    the extruded hollow profile has integral holding sections for each filter element opposing one another, between which holding sections a filter element can be inserted by means of one of the open end faces of the extruded hollow profile, with the wire mesh mats extending in a straight line between the holding sections and the holding sections are formed as U-shaped grooves integral with the outer wall of the housing, the grooves embracing a filter element laterally.

13. A gas generator according to claim 12, characterized in that holding sections are formed at the intermediate walls and on the inner surface of the outer wall of the housing, with the outer wall of the housing having a U-shaped first groove on the inner surface and an end of an intermediate wall facing this first groove likewise having a U-shaped second groove which extends in parallel with the first groove.

14. A gas generator according to claim 13, characterized in that the holding sections of a filter element have a predetermined breaking point for releasing the filter element from the holding section upon the occurrence of a gas pressure exceeding of a certain predetermined combustion-gas pressure acting on the filter element.

15. A gas generator according to claim 13 or 14, characterized in that one of the side-wall sections of the U-shaped grooves on the inner surface of the outer wall of the housing and/or the intermediate wall has a region of reduced wall thickness.

16. A gas generator, in particular a generator for an air bag of a vehicle comprising:
a housing which is open at two opposing end faces and which has an outer wall with at least one gas orifice for discharging of cleaned combustion gases;
two cover elements for closing the end faces of the housing;
a combustion chamber for receiving and burning gas-generating material ignitable by means of an ignition unit located therein, said chamber being arranged in the housing and having at least one outlet orifice in a wall of the chamber for discharging of combustion gases; and
at least one filter element arranged in the housing, each filter element having several wire mesh mats for cleaning the combustion gases flowing therethrough, characterized in that
the housing is formed as a longitudinally extruded hollow profile of a aluminium or an aluminium alloy manufactured in an extrusion process, the extruded hollow profile has integral holding sections for each filter element opposing one another and extending a length of the housing, between which holding sections a filter element can be inserted by means of one of the open end faces of the extruded hollow profile, with the wire mesh mats extending the length of the housing in a straight line between the holding sections, and an inner surface of the outer wall of the housing in the area of a discharge chamber attached to the outlet orifice of the combustion chamber has several receiving pockets open towards an outlet orifice for particles and/or condensed drops of liquid transported along by the combustion-gas flow.

17. A gas generator according to claim 16, characterized in that the receiving pockets are formed by flanges which project inwardly, are directed to the outlet orifice at least in the end region and are integral with the housing wall.

18. A gas generator, in particular a generator for an air bag of a vehicle comprising:
a housing which is open at two opposing end faces and which has an outer wall with at least one gas orifice for discharging of cleaned combustion gases;
two cover elements for closing the end faces of the housing;
a combustion chamber for receiving and burning gas-generating material ignitable by means of an ignition unit located therein, said chamber being arranged in the housing and having at least one outlet orifice in a wall of the chamber for discharging of combustion gases; and
at least one filter element arranged in the housing, each filter element having several wire mesh mats for cleaning the combustion gases flowing therethrough, characterized in that
the housing is formed as a longitudinally extruded hollow profile of a aluminium or an aluminium alloy manufactured in an extrusion process, the extruded hollow profile has integral holding sections for each filter element opposing one another and extending a length of the housing, between which holding sections a filter element can be inserted by means of one of the open end faces of the extruded hollow profile, with the wire mesh mats extending the length of the housing in a straight line between the holding sections, and the combustion chamber is an integral component of the extruded hollow profile of the housing, with the outlet orifice of the combustion chamber being formed as a slot extending over the entire length of the extruded profile.

19. A gas generator, in particular a generator for an air bag of a vehicle comprising:
a housing which is open at two opposing end faces and which has an outer wall with at least one gas orifice for discharging of cleaned combustion gases;
two cover elements for closing the end faces of the housing;
a combustion chamber for receiving and burning gas-generating material ignitable by means of an ignition unit located therein, said chamber being arranged in the housing and having at least one outlet orifice in a wall of the chamber for discharging of combustion gases; and at least one filter element arranged in the housing, each filter element having several wire mesh mats for cleaning the combustion gases flowing therethrough,
characterized in that
the housing is formed as an extruded hollow profile of aluminium or an aluminium alloy manufactured in an extrusion process, and
the extruded hollow profile has integral holding sections for each filter element opposing one another, between which holding sections a filter element can be inserted by means of one of the open end faces of the extruded hollow profile, with the wire mesh mats extending in a straight line between the holding sections and at the outer surface of an outer wall of the housing in the area of the combustion chamber two projecting holding projections integral with the extruded profile, having symmetrical recesses facing each other, are provided and in that by means of one of the end faces of the extruded profile a support element for the ignition unit can be inserted into the recesses, the support element extending between them, with the ignition unit in the installed state extending through two openings, which are in alignment with one another, in the outer wall of the housing and the combustion chamber or, with integral construction of housing and combustion chamber, through an opening in the outer wall of the housing into the combustion chamber.

20. A gas generator, in particular a generator for an air bag of a vehicle comprising:
a housing which is open at two opposing end faces and which has an outer wall with at least one gas orifice for discharging of cleaned combustion gases; two cover elements for closing the end faces of the housing;

a combustion chamber for receiving and burning gas-generating material ignitable by means of an ignition unit located therein, said chamber being arranged in the housing and having at least one outlet orifice in a wall of the chamber for discharging of combustion gases; and at least one filter element arranged in the housing, each filter element having several wire mesh mats for cleaning the combustion gases flowing therethrough, characterized in that the housing is formed as an extruded hollow profile of aluminium or an aluminium alloy manufactured in an extrusion process, and the extruded hollow profile has integral holding sections for each filter element opposing one another, between which holding sections a filter element can be inserted by means of one of the open end faces of the extruded hollow profile, with the wire mesh mats extending in a straight line between the holding sections and several gas orifices are arranged in a row in a longitudinal direction of the extruded profile of the housing and in that at both longitudinal sides of the row of gas orifices there are arranged outwardly projecting curved edge sections integral with the extruded profile, the edge sections forming a nozzle operating after the gas orifices.

21. A gas generator according to claim 20, characterized in that the edge sections of the outer wall of the housing forming the nozzle define a slot and project slightly into the inside of the housing and in that a perforated strip provided with several holes is provided, which has turned-up longitudinal edges with hook-shaped ends to embrace the inwardly projecting areas of the edge sections and can be slipped on by means of one of the end faces of the extruded profile.

22. A gas generator according to claim 20 or 21, characterized in that to improve the entraining of ambient air as a consequence of the combustion-gas flowing out of the nozzle in the area of the nozzle air-guiding plates which are connected as one piece to the housing and are arranged at a distance to these are provided, extending over the entire length of the extruded profile of the housing, with through openings being formed for drawing in the ambient air in the connection area between housing and air-guiding plates.

23. A housing for a gas generator, especially for an air bag gas generator which comprises:

a housing which is open at two opposite ends, said housing body having a housing wall with at least one gas outlet opening therein, and a combustion chamber which is located in the housing body to receive and burn gas-generating material and which has at least one outlet opening, characterized in that the housing is made in the form of a longitudinally extruded hollow profile produced by an extrusion-molding process from aluminum or an aluminum alloy, and the extruded hollow profile has integrated holding or retaining sections opposite one another adapted to receive at least one filter element and between which the at least one filter element is insertable through one of the open ends of the extruded profile; said holding or retaining sections extending an entire length of the profile, said housing body including a through chamber for combustion gas flow formed between the at least one outlet opening of the combustion chamber and the at least one gas outlet opening, said holding sections being located in said through chamber and said extruded profile having partitions to deflect the combustion gas stream, integrated and projecting into the through chamber between the at least one outlet opening of the combustion chamber and the at least one gas outlet opening.

24. A housing for a gas generator, especially for an air bag gas generator which comprises:

a housing which is open at two opposite ends, said housing body having a housing wall with at least one gas outlet opening therein, and a combustion chamber which is located in the housing body to receive and burn gas-generating material and which has at least one outlet opening, characterized in that the housing body is made in the form of an extruded hollow profile produced by an extrusion-molding process from aluminum or an aluminum alloy, and the extruded hollow profile has integrated holding or retaining sections opposite one another adapted to receive at least one filter element and between which the at least one filter element is insertable through one of the open ends of the extruded hollow profile and the holding sections are in the form of U-shaped grooves integrated in a housing outside wall to grasp laterally at least one filter element.

25. A housing according to claim 24, characterized in that the holding sections are formed on the partitions and an inner surface of the housing outside wall, with the housing outside wall having a U-shaped first groove on the inner surface and an end of a partition facing this first groove likewise having a U-shaped second groove, running parallel to the first groove.

26. A housing according to claim 24, characterized in that one of the side wall sections of the U-shaped grooves on the inner surface of housing outside wall and/or the partition has an area of reduced wall thickness.

27. A housing according to claim 24, characterized in that the holding sections for a filter element have a prescored location to release filter element from the retaining sections if a combustion gas pressure acting on a filter element exceeds a predetermined pressure.

28. A housing for a gas generator, especially for an air bag gas generator which comprises:

a housing which is open at two opposite ends, said housing body having a housing wall with at least one gas outlet opening therein, and a combustion chamber which is located in the housing body to receive and burn gas-generating material and which has at least one outlet opening, characterized in that the housing body is made in the form of a longitudinally extruded hollow profile produced by an extrusion-molding process from aluminum or an aluminum alloy, and the extruded hollow profile has integrated holding or retaining sections opposite one another adapted to receive at least one filter element and between which the at least one filter element is insertable through one of the open ends of the extruded hollow profile; said holding or retaining sections extending an entire length of the profile and an inner surface of an outside wall of the housing body in an area of the through chamber abutting an outlet opening of combustion chamber has a plurality of receiving pockets open toward the outlet opening for particles and/or condensed liquid drops entrained by the combustion gas flow.

29. A housing according to claim 28, characterized in that the receiving pockets are formed by inwardly projecting ribs integrated in a housing wall, said ribs being oriented toward an outlet opening at least in an end area.

30. A housing for a gas generator, especially for an air bag gas generator which comprises:
   a housing which is open at two opposite ends, said housing body having a housing wall with at least one gas outlet opening therein, and
   a combustion chamber which is located in the housing body to receive and burn gas-generating material and which has at least one outlet opening, characterized in that the housing body is made in the form of a longitudinally extruded hollow profile produced by an extrusion-molding process from aluminum or an aluminum alloy, and the extruded hollow profile has integrated holding or retaining sections opposite one another adapted to receive at least one filter element in between which the at least one filter element is insertable through one of the open ends of the extruded profile; said holding or retaining sections extending an entire length of the profile; the combustion chamber being an integral component of the extruded hollow profile, with the at least one opening of combustion chamber being in the form of a slot extending over an entire length of the extruded hollow profile.

31. A housing according to claim 30, characterized in that two projecting retaining projections are integrated into the extruded hollow profile and symmetrical recesses facing one another are provided on an outer surface of a housing outside wall in the vicinity of the combustion chamber, and a supporting element for an ignition unit is insertable through one of the ends of the extruded hollow profile into the recesses, said supporting element extending between said recesses, with the ignition unit in the installed state extending through two mutually flush openings in the housing outside wall and the combustion chamber or, with an integral design of the housing body and combustion chamber, through an opening in the housing outside wall into the combustion chamber.

32. A housing for a gas generator, especially for an air bag gas generator which comprises:
   a housing which is open at two opposite ends, said housing body having a housing wall with at least one gas outlet opening therein, and
   a combustion chamber which is located in the housing body to receive and burn gas-generating material and which has at least one outlet opening, characterized in that the housing body is made in the form of a longitudinally extruded hollow profile produced by an extrusion-molding process from aluminum or an aluminum alloy, two projecting retaining projections are integrated into the extruded hollow profile and symmetrical recesses facing one another are provided on an outer surface of a housing outside wall in the vicinity of the combustion chamber, and a supporting element for an ignition element is inserted through one of the ends of the extruded hollow profile into the recesses, said supporting element extending between said recesses, with the ignition unit in the installed state extending through two mutually flush openings in the housing outside wall and the combustion chamber or, with an integral design of the housing body and combustion chamber, through an opening in the housing outside wall into the combustion chamber, and the extruded hollow profile has integrated holding or retaining sections opposite one another adapted to receive at least one filter element and between which the at least one filter element is insertable through one of the open ends of the extruded hollow profile; said holding or retaining sections extending an entire length of the profile.

33. A housing according to claim 31, characterized in that a plurality of gas outlet openings are provided along the length of the extruded hollow profile and outwardly projecting curved marginal sections integrated into the extruded profile are provided on both long sides of a row of gas outlet openings, said marginal sections forming a nozzle downstream from the gas outlet openings.

34. A housing according to claim 33, characterized in that edge sections of a housing outside wall forming the nozzle delimit a slot and project slightly into the interior of the housing, and a hole-containing strip provided with a plurality of holes is provided, said strip having elevated lengthwise edges with hook-shaped ends to fit over the inwardly projecting areas of the marginal sections, and being pushable over one of the ends of the extruded profile.

35. A housing according to claim 34, characterized in that air guide plates are provided to improve the entrainment of ambient air as the result of the combustion gas flowing out of the nozzle in the vicinity of the nozzle, said plates being connected integrally with the extruded profile and located at a distance therefrom, said plates extending over the entire length of the extruded profile and through holes adapted to suck in the ambient air being provided in a connecting area between the extruded profile and the air guide plates.

* * * * *